(12) United States Patent
Newell et al.

(10) Patent No.: US 9,570,835 B2
(45) Date of Patent: Feb. 14, 2017

(54) MODULAR ELECTRICAL WIRE HOUSING UNIT

(71) Applicants: Robert M Newell, Redding, CA (US); Steven B. Puckett, Shasta Lake, CA (US)

(72) Inventors: Robert M Newell, Redding, CA (US); Steven B. Puckett, Shasta Lake, CA (US)

( * ) Notice: Subject to any disclaimer, the term of this patent is extended or adjusted under 35 U.S.C. 154(b) by 24 days.

(21) Appl. No.: 14/663,622

(22) Filed: Mar. 20, 2015

(65) Prior Publication Data

US 2016/0276773 A1  Sep. 22, 2016

(51) Int. Cl.
*H02G 3/08* (2006.01)
*H01R 13/46* (2006.01)
*H01R 43/20* (2006.01)

(52) U.S. Cl.
CPC .............. *H01R 13/46* (2013.01); *H01R 43/20* (2013.01)

(58) Field of Classification Search
CPC .......... H02G 3/08; H02G 3/081; H02G 3/085; H02G 3/16; H02G 3/12; H01R 13/46; H01R 13/506; H01R 43/20; H05K 5/00
USPC ................. 174/50, 53, 57, 58, 60, 480, 481; 220/3.2–3.9, 4.02; 439/76.1, 76.2, 949, 439/650, 41
See application file for complete search history.

(56) References Cited

U.S. PATENT DOCUMENTS

| | | | | |
|---|---|---|---|---|
| 2,433,917 A * | 1/1948 | McCartney | ............ | H02G 3/121 174/50 |
| 3,609,647 A * | 9/1971 | Castellano | ............... | H02G 3/16 174/53 |
| 4,165,443 A * | 8/1979 | Figart | ....................... | H02G 3/16 174/53 |
| 5,378,854 A * | 1/1995 | Hoover | .................. | H02G 3/086 174/53 |
| 5,471,012 A * | 11/1995 | Opel | ........................ | H02G 3/16 174/53 |
| 5,525,754 A * | 6/1996 | Akins | .................. | H01R 4/4827 174/53 |
| 6,617,511 B2 * | 9/2003 | Schultz | .................. | H01R 24/70 174/50 |
| 6,786,766 B1 * | 9/2004 | Chopra | ................ | H01R 4/4827 439/441 |
| 6,937,461 B1 * | 8/2005 | Donahue, IV | ......... | H01R 27/02 174/50 |
| 6,939,179 B1 * | 9/2005 | Kieffer, Jr. | ........... | H01R 13/514 439/650 |
| 6,945,815 B1 * | 9/2005 | Mullally | .................. | H02G 3/14 439/535 |
| 7,160,147 B1 * | 1/2007 | Stephan | .................... | H01R 9/24 174/60 |

(Continued)

*Primary Examiner* — Angel R Estrada (57) ABSTRACT

A wire housing unit has a shell body including a rear wall and two substantially parallel side walls extending orthogonally from the rear wall, a top plate removably attached to the top or bottom portion of the shell body closing the top or bottom, a bottom plate removably attached to the bottom or top portion of the shell body closing the bottom or top, a nailing fin disposed on the outside surface of one of the vertical side walls the fin substantially parallel with the rear wall of the shell body, and a modular contact junction block having a contact plug receptacle and terminals connecting house wires to a plugin outlet or switch assembly. The junction block is removably mounted to the inside surface of the top or bottom plates and in a position to accept contact plug-in of the outlet or switch assembly.

12 Claims, 5 Drawing Sheets

(56) References Cited

U.S. PATENT DOCUMENTS 8,608,490 B2* 12/2013 Keswani ............ H01R 12/7088
439/76.1

* cited by examiner

MODULAR ELECTRICAL WIRE HOUSING UNIT

BACKGROUND OF THE INVENTION

1. Field of the Invention

The present invention is in the field of construction, more particularly electrical wiring, and pertains particularly to methods and apparatus for installing electrical junction boxes and electric utility components.

2. Discussion of the State of the Art

In home construction and repair or maintenance, electrical wiring is installed to enable connection and control of electric utilities such as outlets or switches, for example. Typical new home construction requires installation of electrical wiring boxes at junction points anchored to studs or frame members of the structure before walls are finished. Such prefabricated boxes are designed to be nailed in a correct orientation at a junction point and have break-out tabs in the material that allow for insertion of electrical wires into the interior of the box.

Some units may have a termination block or panel installed in a fixed position within the box, the block or panel having facilities to attach electrical wires that have been stripped at the ends. The wires inserted through the box wall and into the interior are fastened to the termination panel at designated wire connection points. An electrical wall outlet or wall switch or a combination thereof may be installed over the face of the electrical box after the hosting wall is finished. The exposed and trimmed wire ends of the electric utilities (outlet, switch) are connected to the termination block or panel at designated wire connection points. The outlet or switch plate is then fastened to the face of the electrical box.

There are several problems with current utility box installation that may occur during the installation process. For example, correct orientation of the box is required to accommodate the direction of wiring at the junction point. Boxes have only one open face into the interior where contact is made. Therefore, the wiring process may be challenged by lack of adequate room or space to work in making connections and disposing excess wire in any available volume left within the box. Moreover, wiring from the utility outlet must also be confined within a small space making it hard to ensure reliable connections.

Therefore, what is clearly needed is a modular electrical wiring unit that mitigates the problems stated above.

BRIEF SUMMARY OF THE INVENTION

According to an embodiment of the present invention, a modular electrical wire housing unit is provided comprising an open shell body having a rear wall and two substantially parallel side walls extending orthogonally from the rear wall along the opposing vertical edges of the rear wall, a top plate removably attached to the top or bottom portion of the shell body closing the top or bottom, a bottom plate removably attached to the bottom or top portion of the shell body closing the bottom or top, a nailing fin disposed on the outside surface one of the vertical side walls, the fin substantially parallel with the rear wall of the shell body, the fin including at least two openings there through for accepting nails or screws, and a modular contact junction block having a contact plug receptacle and terminals connecting house wires to a plugin outlet or switch assembly. The junction block is removably mounted to the inside surface of the top or bottom plates and in a position to accept contact plug-in of the outlet or switch assembly.

In one embodiment, the top and bottom plates are the same part and are interchangeable in the process of assembling the unit. In one embodiment, the top and bottom plates include at least one breakout opening for harnessing the house wires against the rear wall of the shell body. In one embodiment, the junction block includes individual wire trap openings for securing inserted house wires and a plug-in receptacle for receiving plug-in switch or outlet assemblies. In this embodiment, the plug-in receptacle accepts at least one contact plate from an outlet or switch assembly, the contact plate communicating directly with individual ends of the inserted house wires or indirectly through a conductive intermediary plate generic to the plug-in receptacle.

In one embodiment, the side walls have hook-rail grooves formed along the upper and lower edges thereof accepting hook-rails formed along the opposing plate edges adapted to slide into the hook-rail grooves on the side walls of the shell body. In this embodiment, the wire housing unit further includes snap recesses through the rear wall near the top and bottom edges of the rear wall approximately centered along the vertical axis of the shell body, the snap recesses accepting snap tabs formed at the rearward interfacing edges of the top and bottom plates. In one embodiment, the junction block snaps onto the inside surface of the top or bottom plates.

In one aspect of the present invention, a method of installing a modular electrical wire housing unit and modular outlet or switch is provided, the unit comprising an open shell body having a rear wall, two side walls extending orthogonally from the rear wall, a top and bottom plate removably attachable to the shell body, a nailing fin, and a modular contact junction block removably attachable to the top or bottom plate, the method including nailing the shell body to a wall stud through the nailing fin, preparing the house wires for electrical connection and gathering them between the vertical walls of the shell body, inserting the house wire ends into wire trap openings on the junction block, securing the contact junction block into place on the inside surface of the top or bottom plate, sliding the plate supporting the contact junction block onto the shell body securing it to the rear wall, breaking out at least one perforated wire harness opening in the top and or bottom plate, sliding the plate onto the shell body harnessing the house wires in the harness opening and securing the plate to the rear wall of the shell body, plugging in the outlet or switch into an electrical receptacle on the junction block; and securing the outlet or switch to the top and bottom plates.

In one aspect of the method the nailing fin is on the left or on the right of the shell body when positioned for nailing. In one aspect, the contact junction block snaps onto the inside surface of the top or bottom plate. In one aspect, the top and bottom plates are identical parts and include side hook-rails adapted to fit slidably into hook-rail grooves formed on the side walls of the shell body. In this aspect, the top and bottom plates are snapped into the rear wall.

In one aspect, the modular outlet or switch is secured to the top and bottom plates by screw. In one aspect the contact junction block includes one or more internal contact surfaces interfacing between the wire ends and a contact apparatus on the outlet or switch.

DETAILED DESCRIPTION OF THE INVENTION

The Inventors provide a modular electrical wiring unit that, by virtue of construction and design, facilitates more efficient installation by wiring of electrical outlets, switches, and like electrical components. The present invention is discussed below in enabling detail using the following examples, which may depict more than one relevant embodiment falling within the scope of the present invention.

Figure 1:
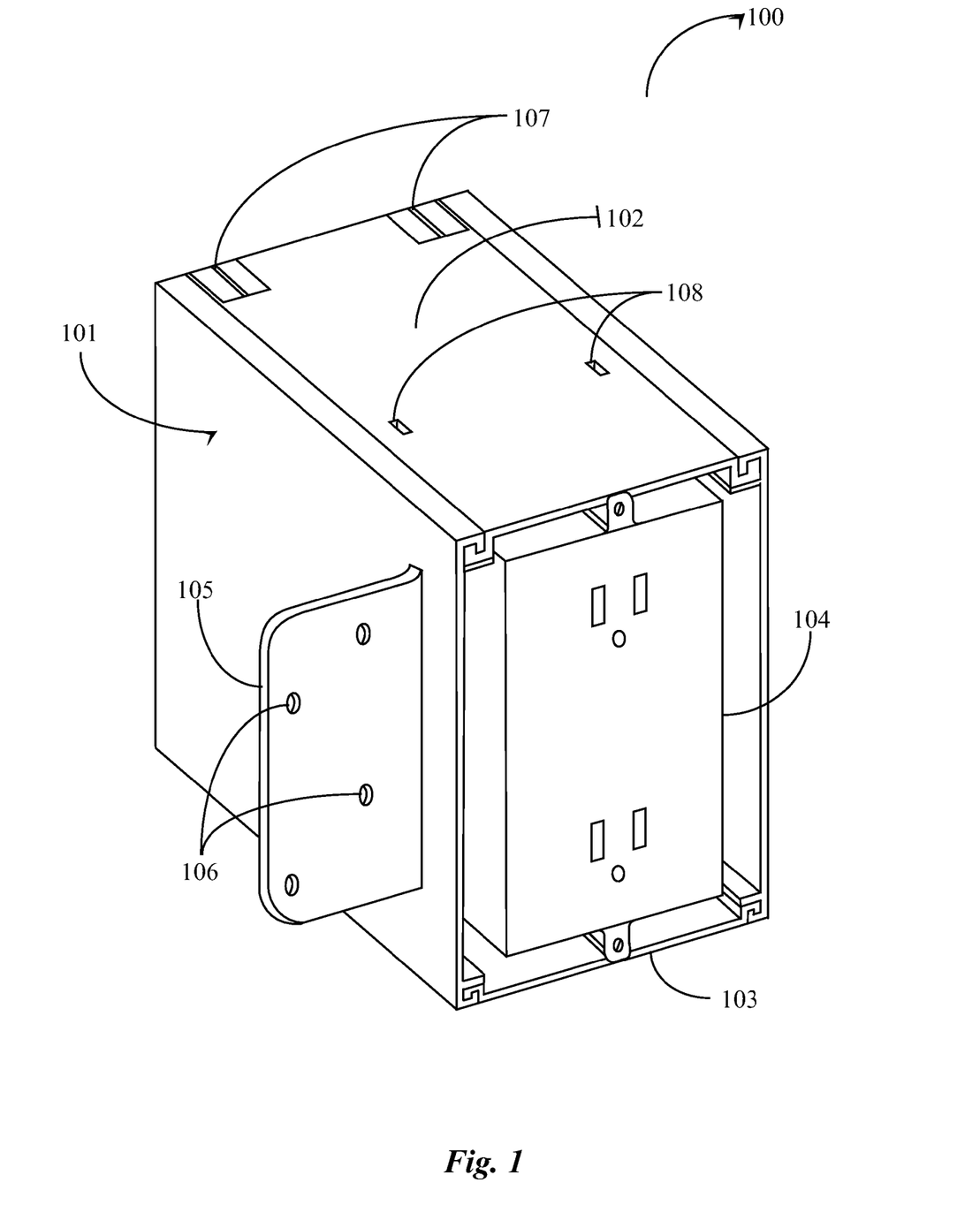
FIG. 1 is a perspective view of a modular wire housing unit according to an embodiment of the present invention.

FIG. 1 is a perspective view of a modular wire housing unit 100 according to an embodiment of the present invention. Housing unit 100 is provided as a modular electrical box that may be used to house electrical wires and wired connections to outlets, switches, and other like electrical components. Wiring housing unit 100 includes an open shell body 101. Shell Body 101 may be fabricated of sheet metal, a durable polymer, or other durable materials. Shell body 101 may be molded using a plastic molding technique. Shell body 101 consists of a rear wall (not illustrated) and two substantially parallel side walls extending orthogonally from the rear wall. The side walls may be contiguously formed with the rear wall such as by fabricating a sheet and then bending the sheet to form the walls. In another embodiment the shell body may be plastic molded. In yet another embodiment the shell body may be fabricated in parts and assembled.

Housing unit 100 includes a top plate 102. Top plate 102 includes opposing hook rails formed in the plate material along each long edge of the plate with the hook form facing upward. Top plate 102 is removably attachable to shell body 101 via a locking rail feature enabling the plate to be slid onto compatible hook rails formed at the top edges and bottom edges of each side wall. Top plate 102 comprises a substantially rectangular plate of a thickness sufficient to render the plate rigid. Top plate 102 may be fabricated from sheet metal, a durable polymer, or another rigid material. Top plate 102 includes a snap tab (not illustrated) proximal to center of a rear edge of the plate. The snap tab is designed to keep the top plate locked into position securing the plate to the rear wall. Top Plate 102 includes at least one breakout tab 107. Tab 107 includes two or more perforated tabs that may be easily removed to make room for wire insert into the interior of the housing. In one embodiment breakout tabs 107 extend to the edge of the plate creating open space large enough to corral one or more house wires. Top plate 102 includes snap recesses 108 adapted to enable snap-on installation of a connection block for making the wire connections to outlets and switches.

The front of wire housing unit 100 is open until an outlet, switch or other electrical component such as a utility component 104 is installed. Wire housing 100 includes a removable bottom plate 103. Bottom plate 103 comprises a substantially rectangular plate of a thickness sufficient to render the plate rigid. In this example, top plate 102 and bottom plate 103 are interchangeable and may be secured either to the top or bottom face of shell body 101. In this example, top plate 102 and bottom plate 103 have hook-rails formed along opposing long edges of the plate. Shell body 101 includes opposing upward facing hook rails formed along each bottom edge of respective side walls and opposing downward facing hook rails formed along each top edge of the respective side walls.

The hook rails of housing 101 are adapted to accept the hook rails of Top plate 102 and bottom plate 103. The plates may be slidably connected to shell body 101 like a drawer. The rear wall of shell body 101 includes at least two snap-tab recesses (not illustrated) for accepting snap tabs (not illustrated) at the rear or interfacing edges of each plate. In one embodiment, the snap tabs for a top or bottom plate comprise apertures formed at the rear edge of the plate substantially centered between the opposing edges of the plate. The snap tabs (not illustrated here) are adapted to be snapped into the rectangular openings or snap tab recesses (not visible here) provided through the back wall of housing 101. In this way, the top and bottom plates slide into shell body 101 and snap into position at housing 101 at the rear of each plate. In this embodiment top plate 102 and bottom plate 103 may be snapped into place on shell body 101 with respect to the bottom and top boundaries of wire housing 100. In one embodiment they may be installed using some other connection or attachment method. The inventor prefers opposing hook rails to enable slide-in and slide-out installation and un-installation of the top and bottom plates.

The design of wire housing unit 100 including removable and interchangeable top and bottom plates enables a user such as a contracted electrician performing the manual wiring to have more freedom of movement and space when stripping the wire ends, maneuvering them and otherwise preparing them for insertion into a wire junction or contact block (not illustrated here). In this example, electrical outlet 104 plugs-into the contact or wire junction block or panel and is then secured by screws that are threaded through the module faceplate and into tapped screw openings top and bottom plates 102 and 103. Break-out tabs 107 provide relief space for containing electrical wires used to make electrical connection. Tabs 107 are also provided on bottom plate 103 and extend to the edge of the plate leaving an open space in from the edge when removed. In this example the top and bottom plates are identically constructed and are interchangeable parts.

Shell body 101 includes at least one nailing fin 105 formed thereon. Nailing fin 105 extends orthogonally from the hosting sidewall and includes at least two openings 106 for accepting carpenters nails. Unit 100 is adapted to be nailed or otherwise fashions to a wall stud using the nailing fin at any location where an electrical junction is desired for wiring in utilities to the house wiring system. In one embodiment, only shell body 101 is nailed into a position for latter installation and connection of the desired electric utility components such as outlet 104.

Figure 2:
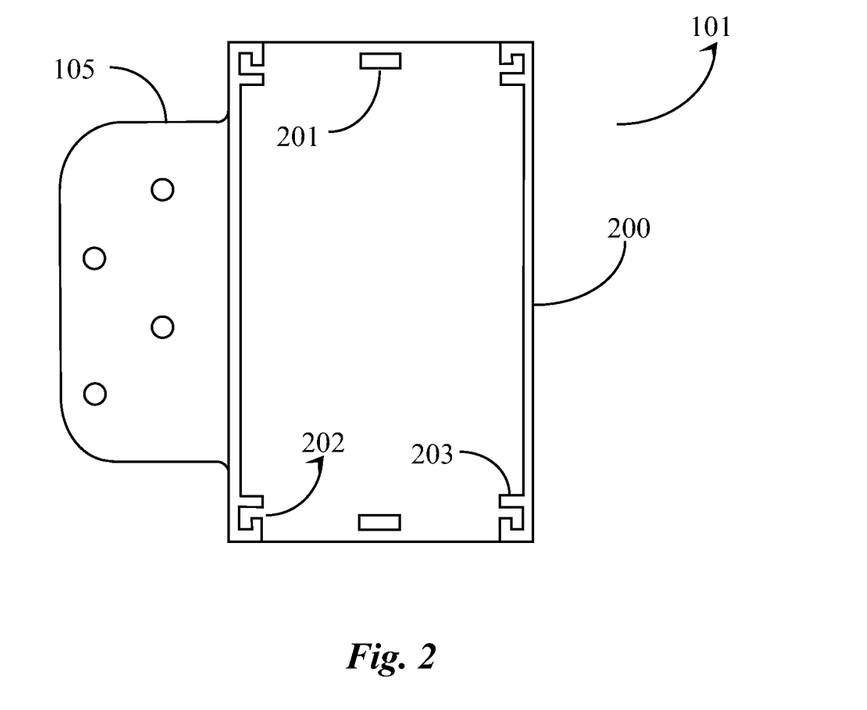
FIG. 2 is a front elevation view of a wire housing frame with top, bottom and hardware removed.

FIG. 2 is a front elevation view of shell body 101 of FIG. 1 with top plate, bottom plate and hardware removed in illustration. Shell body 101 is depicted in elevation view with the floor plate and top plate removed for clarity. Body 101 may be nailed to a wall stud using nailing fin 105. Nailing fin 105 includes two or more through openings (106) for accepting nails. Shell body 101 includes opposing hook rail features 202 disposed at the top and bottom edges of the sidewalls 200. The top hook-rail features are opposing one another and face downward while the bottom hook-rail features are opposing one another and face upward.

Each hook-rail feature includes a stop rail 203. Stop rails 203 are part of the hook rail feature and are disposed along the side walls of shell body sidewalls 200 along with the hook. Stop rails 203 prevent buck-out of floor plate 103 and or fallout of top plate 102 from shell body 101. Shell body 101 includes two rectangular snap recesses 201 placed through the back wall and in proximity to the top and bottom edges of the back wall. Rectangular openings 201 are snap-in seats adapted to accept snap-in apertures on top plate 102 and bottom plate 103. Shell body 101 may be nailed to a stud with the nailing fin to the right or left of the body.

Figure 3:
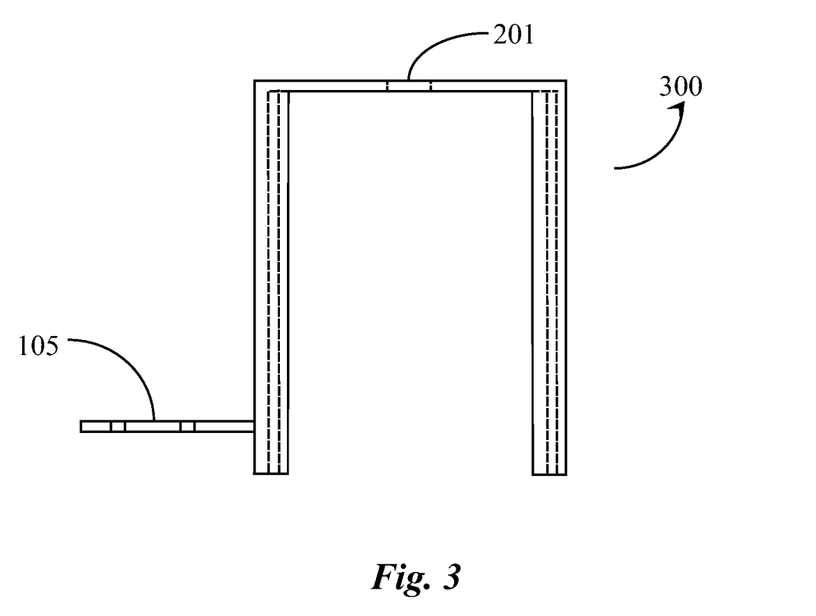
FIG. 3 is an overhead view of the wire housing frame of FIG. 2.

FIG. 3 is an overhead view of shell body 101 of FIG. 2. Shell body 101 may be manufactured in different standard widths to accommodate one or more electrical utilities. Top and bottom plates may be manufactured to conform to the width of shell body 101. Shell body 101 may be nailed to a stud and left "open" until wiring and outlet and or switch installation occurs.

Figure 4:
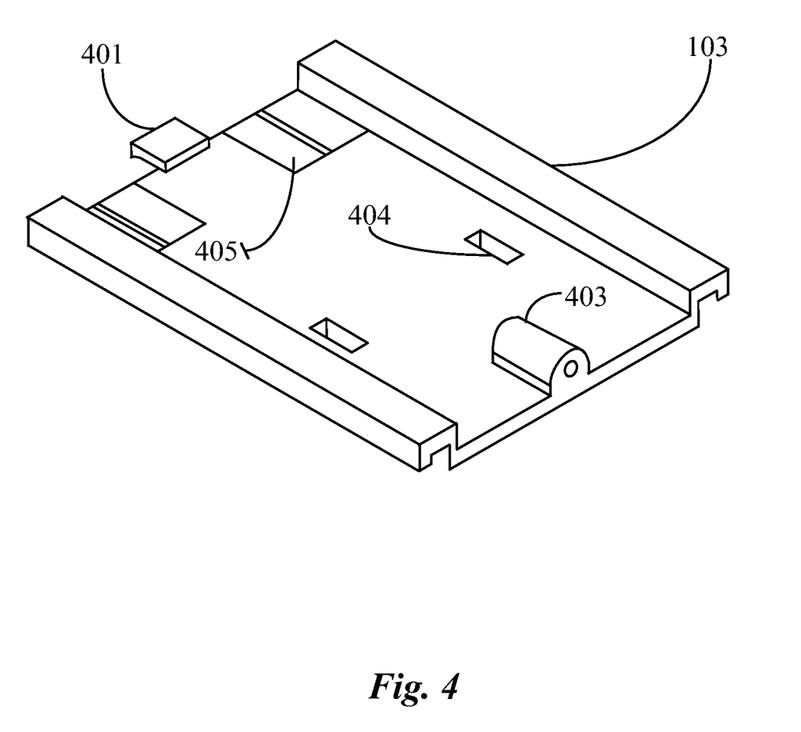
FIG. 4 is a perspective view of a modular top or bottom plate according to an embodiment of the present invention.

FIG. 4 is a perspective view of bottom plate 103 according to an embodiment of the present invention. Bottom plate 103 provides support for and a mounting location for a modular electrical connection panel or block (not illustrated). Bottom plate 103 may also be used as a top plate in this example. Bottom plate 103 includes snap openings 404 which may be analogous to openings 108 of top plate 102 of FIG. 1. Snap openings 404 are adapted to accept snap apertures on an electrical connection panel or block where house wires are connected to enable a working utility such as outlet 104 of FIG. 1.

Bottom plate 103 includes break-out tabs 405 that may extend to the edge of the plate for corralling wires at the rear of the unit. It is important to state that the break-out tab pattern is identical on both top and bottom plates as it is known that wires may be inserted into a wiring unit from the top or the bottom, or both. If the connection block is presented on the bottom plate, wires may be inserted through the top plate to reach the panel. If the connection panel is presented on the top plate, wires may be inserted through the bottom plate break-out tabs. It is possible that wires are inserted through both plates to reach the electrical connection panel or block regardless of whether it is presented on the top or bottom plate.

In one embodiment it is possible that two connection panels or blocks are presented for a single wire housing unit such as one on the top plate and one on the bottom plate. It is noted herein that in this example, breakout tabs 405 and 107 described further above encompass the edge of the plate leaving an open space in from the edge when removed. Therefore, house wires need not be threaded through the wall or top or bottom plates of the wire housing unit. They may be corralled at the rear of the unit at the time the plates are installed.

Bottom plate 103 includes a rear snap aperture 401 formed at the end of the plate in between the break-out tabs 405 or roughly centered on the rear edge of plate 103. Aperture 401 is adapted to fit into snap recess or opening 201 of FIG. 2 after sliding the bottom plate onto the shell body. Bottom plate 103 includes a mounting feature 403 disposed on the edge opposite of snap aperture 401. Mounting fracture 403 includes a threaded screw hole for accepting a standard outlet mounting screw available with the electric switch or outlet installed.

Figure 5:
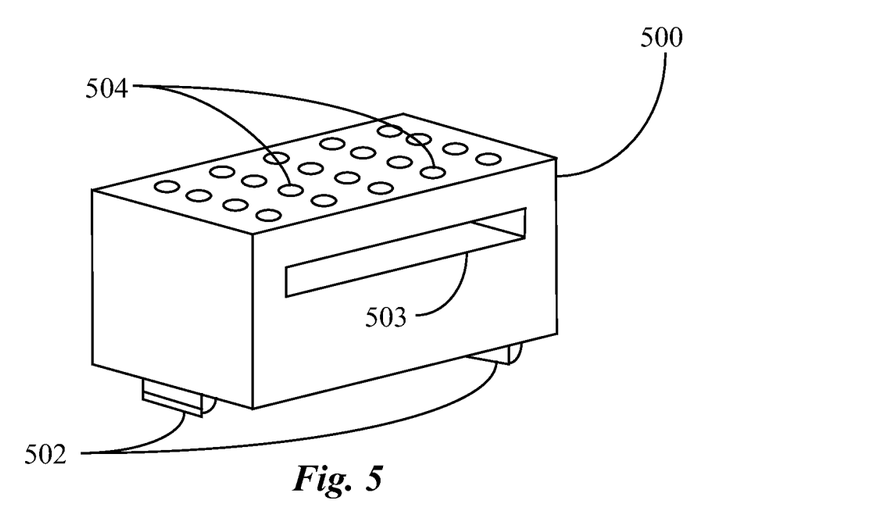
FIG. 5 is a perspective view of a modular wiring junction block removably attachable to the top or bottom plate of FIG. 4.

FIG. 5 is a perspective view of a modular wiring junction block 500 removably attachable to the top or bottom plate of FIG. 1. Junction block 500 includes snap apertures 502, which are designed to fit into snap openings 404 of FIG. 4. In other embodiments, various forms for enabling a snap-in module may be employed such as a pin-snap-in system leveraging openings provided in bottom plate 103 adapted to accept pin-like apertures formed at the bottom of block 500. Block 500 may be modularly positioned horizontally across bottom plate 103 set back from the front edge in a fashion parallel to the front edge of bottom plate 104. Block 500 may be molded from electrical-grade plastic.

Electrical connection block 500 includes wire-trap openings 504 in an array across the top surface of the block. Openings 504 are adapted to accept individual wire ends that have been stripped and pushed down into the openings. Hot wires, neutral wires, and grounding wires may be inserted into openings 504 according to designation that may be presented at the top surface. Designation of which openings accept which wire type is not illustrated here but may be assumed present on the junction block. Designation of which wire type to insert may be by letter (H, N, Gnd), by any standardized color code.

Wiring block 500 includes a conductive receptacle 503. Receptacle 503 may be a horizontal slot as depicted in this example. Receptacle 503 is adapted to accept a male plug-in plate that may include conductively isolated rails that match the pattern of the wire trap array such that inserted wires make contact with the plate either directly or indirectly via a middle conductor such as an intermediary conductive plate that may be part of the connection block 500. More detail about the actual connection is provided later in this specification.

Figure 6:
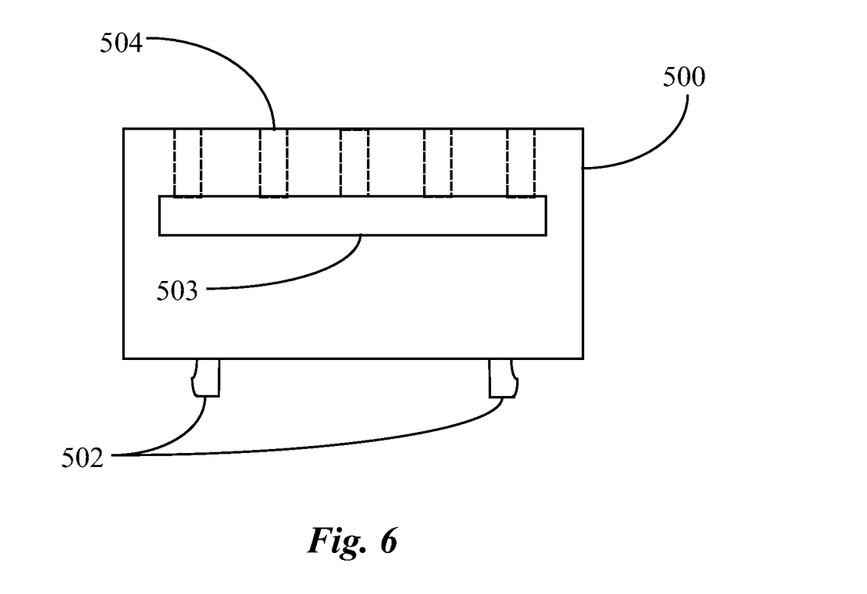
FIG. 6 is a front elevation view of the wiring junction block of FIG. 5.

FIG. 6 is a front elevation view of wiring junction block 500 of FIG. 5. Wire trap openings 504 extend through to open space in receptacle 503 in this example. In one embodiment there may be in intermediate contact plate or plates disposed between the open space in receptacle 503 and contact points at the ends of wire trap openings 504. An outlet such as outlet 104 of FIG. 1 plugs into receptacle 503 by virtue of a contact plate having conductively isolated bars that make alignment with individual rows of wire traps so as not to cross wire connections.

Figure 7:
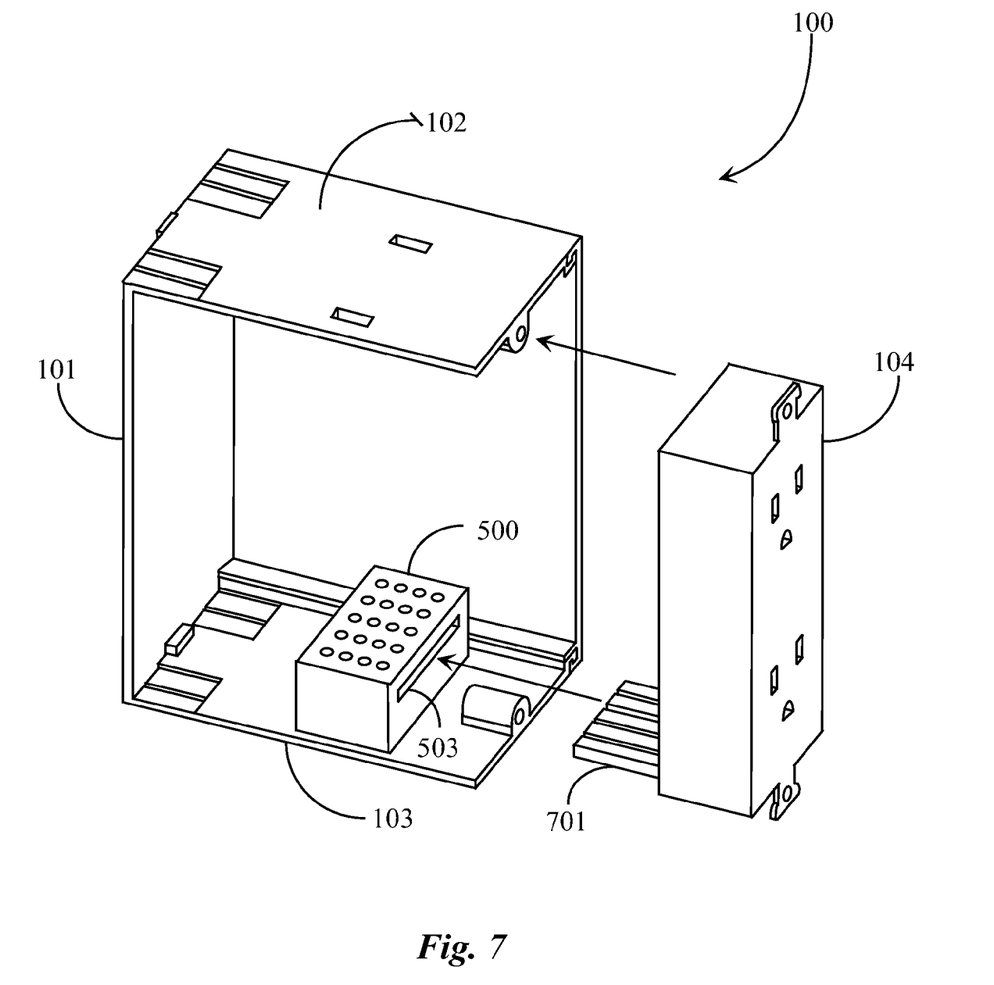
FIG. 7 is a perspective cut-away view of the modular wire housing of FIG. 1 with a modular outlet utility oriented for installation.

FIG. 7 is a perspective cut-away view of the modular wire housing unit 100 of FIG. 1 with a modular outlet utility oriented for installation. In this view, the left side wall of shell body 101 hosting the nailing fin is cut away for clarity. Block 500 is depicted snapped onto bottom plate 103 in a position to accept outlet 104. Outlet 104 is modified to include a plug-in contact plate 701 adapted to be used with the wire trap opening array on block 500. Each bar on contact plate 701 aligns with a row of wire trap openings on block 500. Contact plate 702 is plugged into receptacle 503 after wiring has been performed. Outlet 104 is secured to the wire housing via screws at mounting locations provided on the top and bottom plates.

In one embodiment different shell body widths may be provided with matching top/bottom plates to accommodate such as a panel of utilities without departing from the spirit and scope of the invention. For example, a unit might be just less than 16 inches wide with nailing fins on both sidewalls. The top/bottom plate may have snap-recesses or openings to accommodate several connection blocks the fins nailed to adjacent studs. Vertical orientations of wiring unit 100 may also be envisioned.

In use of the invention, a user such as construction worker may place and nail one or more shell bodies at the marked junction points where wiring will be performed. Next the user or another user performing wiring preparation may gather the correct house wire ends between the vertical walls of the appropriate or "host" shell body, cut them to the desired length and strip them of insulation at the ends for connection purposes. The user may then grab a junction block and insert the prepared wire ends into the appropriate wire trap openings on the junction block.

The user may then secure, such as by snapping onto, the contact junction block into place on the inside surface of the top or bottom plate. The user may then slide the plate supporting the contact junction block onto the shell body via the hook rails and snap it in to secure it to the rear wall of the shell body. The user may then break out one or more breakout tabs in the plate that will harness the house wires against the rear wall of the housing. The user may then slide the plate onto the shell body via the hook rails and place the house wires into the openings left by the breakout tab removal and securing the plate to the rear wall of the shell body via snap apertures.

The user may then plug in an outlet or switch into an electrical receptacle on the junction block and may secure it to the top and bottom plates. In one embodiment, the top and bottom plates are left on the shell bodies but not snapped in when the first user or any user nails up the shell bodies. The associated junction block or blocks may be left inside the open space. The next user, typically the electrician may then prepare the wires and finish the installation.

It will be apparent to one with skill in the art of electric wiring that variations in the wiring and switch installation process may be undertaken by the user in light of conditions such as the number of wires, type of utility supported by the installation and so on.

It will be apparent to one with skill in the art that the modular wire housing unit of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A modular electrical wire housing unit comprising:
   an open shell body having a rear wall and two substantially parallel side walls extending orthogonally from the rear wall along the opposing vertical edges of the rear wall;
   a top plate removably attached to the top or bottom portion of the shell body closing the top or bottom;
   a bottom plate removably attached to the bottom or top portion of the shell body closing the bottom or top;
   a contact plate of an electrical outlet or switch consisting of a plurality of electrically conductive contact bars, each contact bar aligned in parallel forming a plane extending away from the electrical outlet or switch; and
   a modular contact junction block having a top surface and bottom surface, a contact plate receptacle positioned between the top and bottom surfaces including a recessed inner volume and an array of individual wire-trap openings extending from the top surface of the junction block into the inner volume, the wire-trap openings oriented in a plurality of linear rows;
   wherein the junction block is removably mounted via the bottom surface to an inside surface of the top or bottom plates and in a position to accept the contact plate of the outlet or switch assembly and the linear rows are oriented to align with the contact bars and the wire-trap openings are enabled to accept the individual wire ends enabling direct contact with one or more of the contact bars.

2. The wire housing unit of claim 1 wherein the top and bottom plates are the same part and are interchangeable in the process of assembling the unit.

3. The wire housing unit of claim 1 wherein the top and bottom plates include at least one breakout opening for harnessing the wires against the rear wall of the shell body.

4. The wire housing unit of claim 1 wherein the side walls have hook-rail grooves formed along the upper and lower edges thereof accepting hook-rails formed along the opposing plate edges adapted to slide into the hook-rail grooves on the side walls of the shell body.

5. The wire housing unit of claim 1 further including snap recesses through the rear wall near the top and bottom edges of the rear wall approximately centered along the vertical axis of the shell body, the snap recesses accepting snap tabs formed at the rearward interfacing edges of the top and bottom plates.

6. The wire housing unit of claim 5 wherein the junction block snaps onto the inside surface of the top or bottom plates.

7. A method of installing a modular electrical wire housing unit and modular outlet or switch, the unit comprising an open shell body having a rear wall, two side walls extending orthogonally from the rear wall, a top and bottom plate removably attachable to the shell body, and a modular contact junction block having a top and bottom surface, a contact plate receptacle positioned between the top and bottom surfaces including a recessed inner volume and removably attachable to the top or bottom plates comprising:
   preparing the house wires for electrical connection and gathering them between the vertical walls of the shell body;
   inserting individual ones of the wire ends into individual wire trap openings on the top surface of the junction block, the wire trap openings forming an array of linear rows extending into the inner volume;
   securing the contact junction block into place on the inside surface of the top or bottom plate;
   breaking out at least one perforated wire harness opening in the top and or bottom plate;
   sliding the top or bottom plate with the junction block attached onto the shell body harnessing the house wires in the harness opening and securing the plate to the rear wall of the shell body;
   plugging in a contact plate of the outlet or switch consisting of a plurality of electrically conductive contact bars, each contact bar aligned in parallel forming a plane extending away from the outlet or switch into the inner volume of the contact plate receptacle, wherein the linear rows are oriented to align with the contact bars enabling direct contact between the wire ends and one or more of the contact bars; and
   securing the outlet or switch to the top and bottom plates.

8. The method of claim 7 wherein a nailing fin is provided on the left or on the right of the shell body when positioned for nailing to a stud.

9. The method of claim 7 wherein the contact junction block snaps onto the inside surface of the top or bottom plate.

10. The method of claim 7 wherein the top and bottom plates are identical parts and include side hook-rails adapted to fit slidably into hook-rail grooves formed on the side walls of the shell body.

11. The method of claim 7 wherein the top and bottom plates are snapped into the rear wall.

12. The method of claim 7 wherein the modular outlet or switch is secured to the top and bottom plates by screw.

\* \* \* \* \*